W. FEICKS.
COKE OVEN.
APPLICATION FILED DEC. 15, 1909.

1,011,932. Patented Dec. 19, 1911.

Witnesses:
Inventor: William Feicks

UNITED STATES PATENT OFFICE.

WILLIAM FEICKS, OF BETHLEHEM, PENNSYLVANIA.

COKE-OVEN.

1,011,932.  Specification of Letters Patent.  Patented Dec. 19, 1911.

Application filed December 15, 1909. Serial No. 533,308.

*To all whom it may concern:*

Be it known that I, WILLIAM FEICKS, a citizen of Germany, residing at 223 North street, Bethlehem, in the county of Northampton and State of Pennsylvania, have invented a new and useful Gas-Furnace or Coke-Oven, of which the following is a specification.

My invention relates to improvements in gas furnaces or coke ovens having vertical heating flues; and the objects of my improvements are, first, to provide a more efficient and simpler means for heating the air for combustion; and second, to provide means for regulating the supply of air and gas to each heating flue.

According to the present invention the heating flues have inserted tubes or the like made of fire clay, fire brick or other refractory material, by which the air is conducted to the places of combustion, on its way through said tubes becoming highly heated.

The air supply and heating tubes form separate, independent bodies with respect to the oven structure and can furthermore in case of their becoming defective be readily exchanged through openings provided for this purpose in the oven structure. The air inlets of said tubes can be separately and individually regulated by nozzles, slides or the like, which are likewise accessible through the before mentioned openings.

The gas for combustion is distributed over the oven walls in the usual manner by pipes or the like, provided with nozzles or burners. In order to allow an easy control and regulation of the nozzles or burners without discomfort to the workmen, I propose to connect the gas distributing bodies to the gas main by flexible tubes, such as rubber hoses or the like, so that said supply distributing bodies may readily be drawn out of the oven structure and inspected without first having to turn off the gas supply and to break any flange connections.

The invention will now be described with reference to the accompanying drawing, in which—

Figure 1:
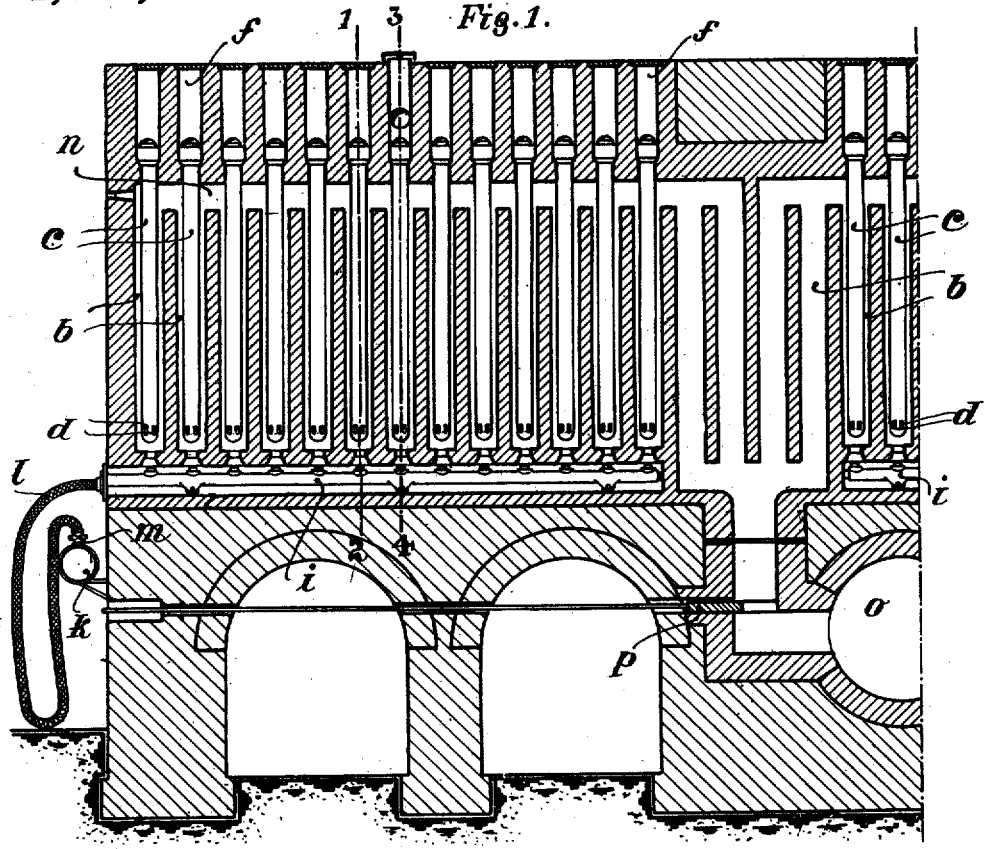
Figure 2:
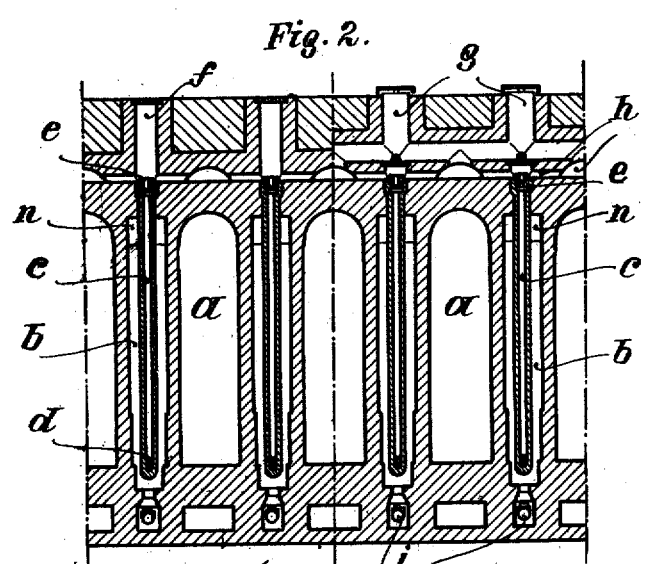
Figure 3:
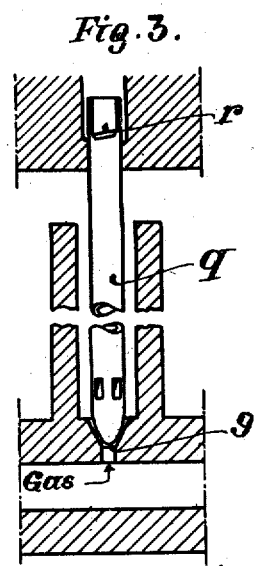

Figure 1 is a longitudinal section through an oven wall; Fig. 2 a section through a battery of ovens partly on lines 1—2 and partly on lines 3—4 of Fig. 1; and Fig. 3 is a detailed sectional view showing a special construction and arrangement of the air supply and heating tubes by which same can also be used as a means for regulating the gas supply to each heating flue.

In the horizontal oven selected by the way of example the coking chambers $a$ and the heating walls $b$ are arranged side by side in the usual manner. The heating flues of the oven walls have inserted these air supply and heating tubes $c$, which are provided with air outlets $d$ at their lower end. The upper ends of said tubes are furnished with nozzles $e$, which are interchangeable through openings $f$ in the oven structure. These openings also allow the whole tubes to be drawn out of the heating flues and repaired or new ones inserted if such should become necessary.

The air enters the oven structure through openings $g$ and before entering the tubes $c$ is subjected to a preliminary heating in a system of flues or channels $h$ arranged above the oven chambers.

The gas for combustion is conveyed to and distributed over the heating flues by the distributing bodies $i$ of which there are two for each oven wall. They are connected to the gas main $k$ by rubber hoses $l$. A cock $m$ serves to regulate the supply of gas to each distributing body, while the amount of gas supplied to each heating flue can be regulated after the body $i$ is drawn out of the oven structure by exchanging the nozzles or burners.

The products of combustion after leaving the heating flues at the top, pass through the upper horizontal flue $n$ and down through the four center flues to the main conduit $o$. The influence of the chimney draft on each oven wall can be regulated by the damper $p$.

The construction and arrangement of the air supply and heating tube as shown detailed in Fig. 3 has for its purpose to serve also as a means for regulating the supply of gas to the heating flue. The air supply and heating tube $q$ in this case is provided on its upper end with projections having inclined faces, $r$, which rest on similar projections of the oven brick work. The lower end of the tube is tapered, and projects into the tapered gas inlet $s$. Through turning the tube, which can be effected from above the same is raised or lowered, thereby increasing or decreasing the effectual cross section of the gas inlet $s$.

Having now described and ascertained the nature of my said invention, I declare that what I claim is:—

1. In a battery of gas furnaces or coke ovens having vertical heating flues, air supply pipes in said flues, terminating at or near the lower ends of the latter, and forming separate and independent bodies with respect to the oven structure.

2. In a battery of gas furnaces or coke ovens having vertical heating flues, air supply pipes in said flues, terminating at or near the lower ends of the latter, and forming separate and independent bodies with respect to the oven structure, and openings in the upper part of the oven structure so as to permit access to aforesaid pipes.

3. In a battery of gas furnaces or coke ovens having vertical heating flues, air supply pipes in said flues, terminating at or near the lower ends of the latter, and forming separate and independent bodies with respect to the oven structure, and air passages in the upper part of the oven structure, communicating with the upper ends of aforesaid pipes.

4. In a battery of gas furnaces or coke ovens having vertical heating flues, air supply pipes in said flues, terminating at or near the lower ends of the latter, and forming separate and independent bodies with respect to the oven structure, air passages in the upper part of the oven structure, communicating with the upper ends of said pipes, means for separately regulating the air supply of said pipes, and openings in the upper part of the oven structure, so as to permit access to aforesaid pipes and regulating means.

5. In a battery of gas furnaces or coke ovens having vertical heating flues, air supply pipes in said flues, terminating at or near the lower ends of the latter, and forming separate and independent bodies with respect to the oven structure, openings in the upper part of the oven structure, so as to permit access to said pipes, and gas supply passages communicating with the lower ends of said vertical heating flues, and controllable by means of aforesaid air supply pipes.

WM. FEICKS.

Witnesses:
NESTRE H. MEASE,
FRANK A. SULLIVAN.

Copies of this patent may be obtained for five cents each, by addressing the "Commissioner of Patents, Washington, D. C."